United States Patent [19]

Grossman et al.

[11] 4,204,335

[45] May 27, 1980

[54] INSTRUMENT FOR POSITIONING PICTURES ON A MOUNTING BOARD

[75] Inventors: Morris G. Grossman, Wyckoff; Edward D. Levy, Franklin Lakes; Edward H. Meisner, Wyckoff, all of N.J.

[73] Assignee: Falcon Safety Products, Inc., Mountainside, N.J.

[21] Appl. No.: 52,737

[22] Filed: Jun. 28, 1979

Related U.S. Application Data

[63] Continuation of Ser. No. 814,544, Jul. 11, 1977, abandoned.

[51] Int. Cl.² ............................................. G01B 3/10
[52] U.S. Cl. ........................................ 33/476; 33/184.5; 33/191
[58] Field of Search ................. 33/474, 476, 479, 403, 33/189, 191, 185 R, 184.5, 42

[56] References Cited

U.S. PATENT DOCUMENTS

| | | | |
|---|---|---|---|
| 778,521 | 12/1904 | Wheat | 33/474 X |
| 2,118,747 | 5/1938 | Vest | 33/191 |
| 2,821,027 | 1/1958 | Billhimer | 33/189 |
| 3,156,984 | 11/1964 | Palmer | 33/189 |

*Primary Examiner*—William D. Martin, Jr.
*Attorney, Agent, or Firm*—William F. Sonnekalb, Jr.

[57] ABSTRACT

An instrument for locating and positioning prints, pictures or pictorial displays of all kinds on a flat support.

7 Claims, 6 Drawing Figures

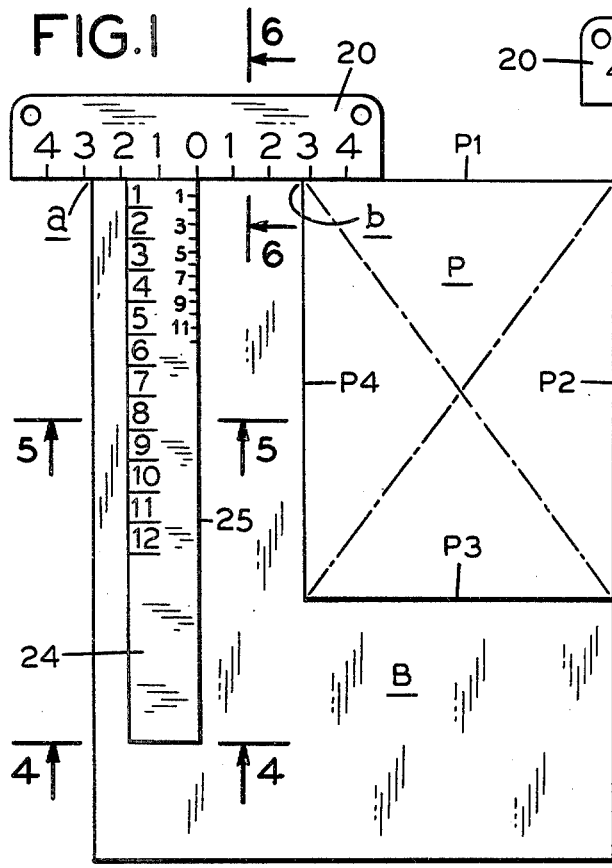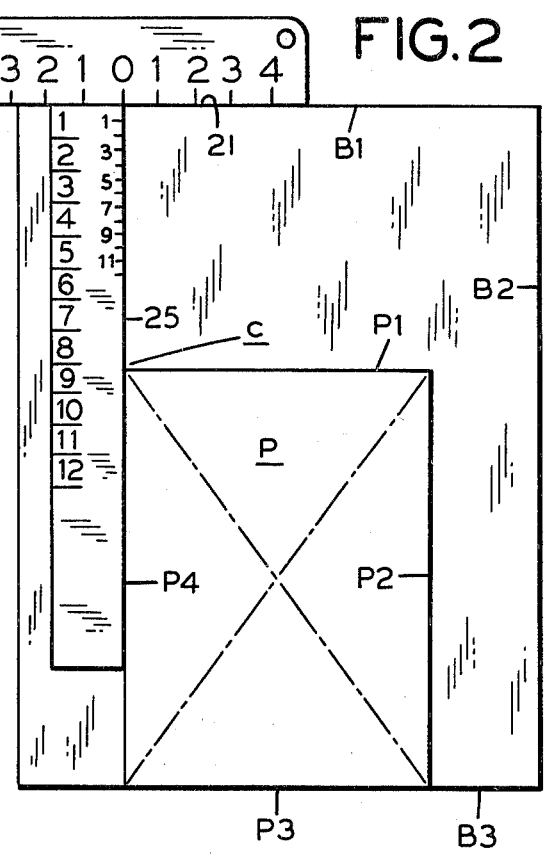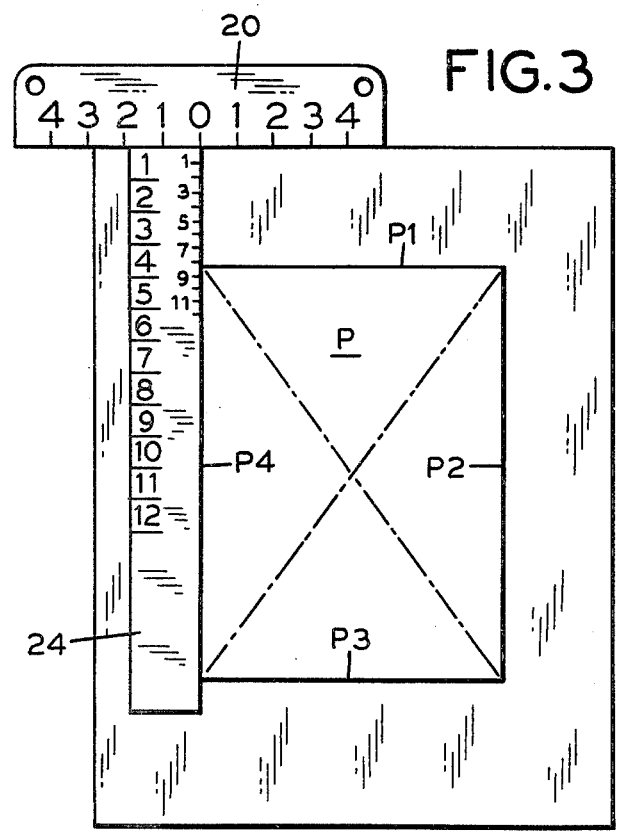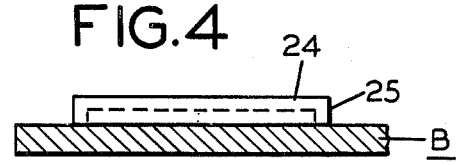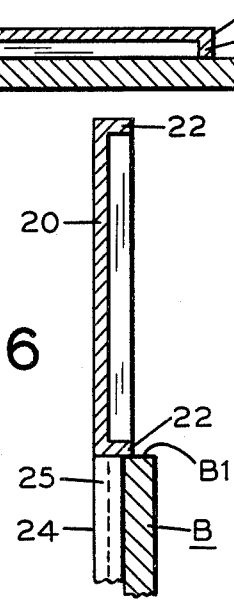

INSTRUMENT FOR POSITIONING PICTURES ON A MOUNTING BOARD

This is a continuation of application Ser. No. 814,544, filed July 11, 1977 now abandoned.

This invention relates to an instrument for locating and positioning prints, pictures or pictorial displays of all kinds on a flat support, mounting board or flat mount of any sort regardless of thickness of the mount, such as, for example, photographic prints on a cardboard, or other support.

The commonly preferred visual position of a rectangular print or picture on a mount is with the picture spaced equidistantly from each side edge of the mount and slightly closer to the top edge than to the bottom edge of the mount.

Mounting a picture on a mount by sighting without a ruler is difficult and gives uncertain usually unsatisfactory results whether a number of pictures of the same size are to be mounted on mounts of the same size or whether the pictures are of different sizes and the mounts are of different sizes.

Use of a ruler usually involves measuring, dividing, drawing and erasing lines, and some guess work as to the proper proportioning of the top and bottom borders. To achieve professional-looking results considerable time and effort are necessary, both for the amateur and the professional.

So far as presently known, nothing more satisfactory than a ruler has been available on the market to assist in mounting pictures on mounting boards.

It is an object of this invention to provide an instrument for use in mounting rectangular pictures and the like on mounts with accuracy, ease and definitness in the optimum artistic position, without limitation as to size of the picture or mount.

Another object is to provide an instrument as aforesaid which can be inexpensively manufactured from molded synthetic plastic material or other material in one piece.

Another object is to provide an instrument as aforesaid for positioning a picture or the like without the need for pencil-marking or drawing measuring lines.

Another object is to provide an instrument as aforesaid for positioning a picture by a few simple sliding motions of the picture along the edges of the instrument to locate the picture in the desired position quickly and with minimum of calculation and effort.

Other objects will appear as the invention is described in connection with the accompanying drawing.

FIG. 1 is a plan view of the instrument comprising the invention when laid on a mounting board with a print or picture placed in the first position for mounting the picture on the board.

FIG. 2 is a view similar to FIG. 1 with the picture in a succeeding position.

FIG. 3 is a view similar to FIG. 1 with the picture in a third and final position.

FIG. 4 is an enlarged end view, looking along line 4—4 at the leg of the instrument in FIG. 1.

FIG. 5 is an enlarged transverse section view taken along line 5—5 through the leg of the instrument.

FIG. 6 is an enlarged end view, looking along line 6—6 at the leg of the instrument.

Referring to the drawing, the instrument comprising the invention is placed on a rectangular mounting board or mount B.

The instrument is preferably molded from synthetic plastic material and may be transparent, translucent or opaque and of generally T-shape with a head portion 20 from which a leg portion 24 extends perpendicular thereto. The top surfaces of the head and leg parts are preferably flat and coplanar. The leg part is located with one longitudinal edge 25 located in alignment with the center of inner edge 21 of the head. The thickness and width of the head and leg portions may be of any convenient dimensions. In the example illustrated the head portion is slightly larger.

To save material and provide stiffness the leg part 24 is provided with a bead 26 along its edges extending from its under surface, that is, toward the mount when the instrument is in use. The bead along the right edge of the leg provides a narrow flat straight surface along which one edge P4 of a rectangular picture P may be slid.

Likewise, the head part 20 is also provided with a bead 22 along its edges extending from its under surface toward the mount. The head bead 22 extends further from the head portion, i.e., is deeper than the leg bead 26 so that when the instrument is placed as shown in FIGS. 1-3 with the head alongside the upper edge B1 of the mount, the bead 22 will abut (see FIG. 6) the edge B1 enabling the head of the instrument to slide along and be guided by the edge B1 of the mount.

In other words, when the instrument is laid on the mount, the inner edge 21 of the head must overlie the top edge of the mount and be able to be pushed up against the said edge until the head stops, and then to be slidable back and forth along that edge.

Three indexing scales are inscribed by printing or other known means on the instrument, one on the head and two on the leg. The scale on the head may have a zero point located at the center of the lower or inner edge 21 of the head. Equal divisions, reading in inches or centimeters or other equal divisions extend to the right and to the left of the zero point.

A second scale is inscribed on the left side of the face of the leg and may, likewise, be in inches or centimeters or other equal divisions, starting from the intersection of the leg with the head.

A third but smaller scale is inscribed on the right side of the face of the leg starting from the intersection of the leg with the head. Its divisions will be determined by the formula $X \times A/2$ where A equals one division or one inch or one centimeter, as chosen for the second scale; and X equals the ratio of the top border to the bottom border.

The value of X has been determined empirically from observations noted and measurements taken when a large number of people placed various sizes of pictures on various sizes of mounts in the position each person determined the position he liked best or proper or most pleasing to him. It was noted that the bottom margin was most routinely larger than the top, and the ratio of top to bottom was in almost all cases the same regardless of the size of the picture and the mount. The value of X, so determined was about 0.8750. For example, if the large scale on the leg is assumed to be twelve (12) inches long, the small scale would be five and one quarter inches (5.25) long divided into twelve divisions and four equal subdivisions between each of the twelve divisions.

It will be understood that the formula having been determined empirically, the number 0.8750 is a composite and not a rigid limitation.

It may vary slightly, plus and minus, to embrace those of said observations which were nearest to the determined number.

In use, the instrument is placed on the mount with the inner edge of the head against the upper edge of the mount. The picture which is to be positioned is placed in the upper right corner of the mount with the upper edges of the mount and the picture in juxtaposition, as in FIG. 1. The instrument is then slid along the top edge of the mount until the numbers at points a and b read the same.

The picture is then slid horizontally until its left edge P4 abuts the right edge 25 of the instrument. This positions the picture with its vertical centerline in alignment with the centerline of the mount. Now the picture is slid down along edge 25 into the position of FIG. 2 with the lower edges of the picture B3 and border P3 juxtaposed. A reading on the large scale on the left of the leg 24 of the location of the upper edge P1 of the picture is then taken.

Finally the picture is slid up until its upper edge reaches the same number or reading on the small scale on the right edge of the leg 24. The picture is then properly positioned on the board with the right and left margins equal, and the lower margin slightly larger than the top margin. The picture can then be glued, pasted or otherwise secured in that position.

Although the instrument may be transparent, translucent or opaque, transparent material is preferable because, when dealing with narrow side margins, it is easier to center and take readings looking through the instrument.

The speed and accuracy with which the picture can be positioned is significant. Only five simple positions or motions are necessary. The first is the placement of the picture as in FIG. 1; the second is placement of the instrument so that the readings at a or b are the same; third is the guided sliding of the picture to the left from FIG. 1 until it abuts the leg 24; fourth is the guided sliding of the picture to the position of FIG. 2; fifth is the guided sliding of the picture back up, to the final position of FIG. 3.

The simplicity of use of the instrument coupled with the accuracy and speed of location of the picture make the instrument very valuable to amateurs and professionals alike.

If the instrument is made of other than synthetic plastic material, such as cardboard, fiber, metal or composition board, it is preferable in all cases for the part 21 of the head part to be able to extend down over the edge B1 of the mounting board so that the head can slide along the edge B1 and be guided thereby.

The term "picture" as used herein and in the claims is intended to include any display piece bearing a painting, picture, diagram, printing or information of any sort, and is not limited to photographic or other prints.

Modifications within the scope of the invention will occur to those skilled in the art. Therefore, the invention is not limited to the specific form and dimensions illustrated.

We claim:

1. An instrument for positioning a picture on a mounting board or support by taking readings from said instrument and physically sliding said picture along said instrument, said instrument comprising head and leg parts joined together in substantially T-shape, said leg part having a straight edge extending perpendicularly from a point on a straight edge of the head part, two like scales having similar divisional markings extending along said head part reading in opposite directions from said point, two scales each having divisional markings extending along said leg part from its intersection with said head part, the spacing of the markings of the second leg-scale being proportionally closer to each other than the spacing of the markings of the first leg-scale, the proportion being determined by one-half the ratio other than unity of the desired width of the upper border to the desired width of the lower border, above and below a picture mounted on the support, said first leg-scale providing for a reading to be taken of the location of the upper edge of the picture when the lower edge of the picture is aligned with the lower edge of the support, said second leg-scale providing for location of said upper edge of the picture when said upper edge is positioned at the marking of said second leg-scale equivalent to said taken reading.

2. An instrument as claimed in claim 1 wherein said head part has means-formed-along-an-edge for engaging and sliding along an edge of the support when the instrument is laid flat on the support with said head part beyond said edge of the support, and the intersecting edges of said head and leg portions being engageable by a picture lying on said support so as to guide sliding movement of the picture along said head and leg edges.

3. An instrument as claimed in claim 1 wherein the proportion of the marking scale of said second leg-scale is determined by the formula X times one-half A, where A equals one division on said first leg-scale and X is the ratio of the width of the top margin to the width of the bottom margin, said margins having been determined empirically as a composite of preferential positions chosen by a large number of people and of large number of pictures of different sizes on a large number of supports of different sizes.

4. An instrument as claimed in claim 1, wherein said ratio is about 0.8750.

5. An instrument for positioning a picture on a mounting board or support by taking readings from said instrument and physically sliding said picture along said instrument, said instrument comprising head and leg parts joined together in substantially T-shape, said leg part having a straight edge extending perpendicularly from a point on a straight edge of the head part, two like scales having similar divisional markings extending along said head part reading in opposite directions from said point as a zero point, whereby when said picture is placed with one edge along one edge of said support and said zero point edge is located equidistantly between the other parallel edges of the picture and the support, the zero edge of said leg may be used to locate said picture equidistantly between the parallel edges of said support, two scales of divisional markings extending along said leg part from its intersection with said head part, the spacing of the markings of the second leg-scale being proportionally closer to each other than the spacing of the markings of the first leg-scale, the proportion being determined by one-half the ratio other than unity of the desired width of the upper border to the desired width of the lower border, above and below a picture mounted on the support, whereby placement of the top edge of the picture at the marking position on said second leg-scale corresponding to the marking position of the top of the picture on said first leg-scale of when said picture had been placed with its bottom edge along the bottom edge of the support, serves to locate the picture at a predetermined optimum position between the top and bottom edges of the support.

6. An instrument as claimed in claim 5 wherein said head part has means-formed-along-an-edge for engaging and sliding along an edge of the support when the instrument is laid flat on the support with said head part beyond said edge of the support, and the intersecting edges of said head and leg portions being engageable by a picture lying on said support so as to guide sliding movement of the picture along said head and leg edges.

7. An instrument as claimed in claim 5 wherein said ratio is about 0.8750.

* * * * *